Nov. 29, 1955  G. T. CHURCH  2,724,846
MACHINE FOR WASHING OR CLEANING EGGS
Filed Oct. 17, 1951  2 Sheets-Sheet 1

Inventor
George Thomas Church
By [signature]
AGENT

Nov. 29, 1955   G. T. CHURCH   2,724,846
MACHINE FOR WASHING OR CLEANING EGGS
Filed Oct. 17, 1951   2 Sheets-Sheet 2

Inventor
George Thomas Church

By [signature]
Agent

United States Patent Office 2,724,846
Patented Nov. 29, 1955

2,724,846

MACHINE FOR WASHING OR CLEANING EGGS

George Thomas Church, Chertsey, England

Application October 17, 1951, Serial No. 251,670

Claims priority, application Great Britain
October 17, 1950

4 Claims. (Cl. 15—3.15)

This invention relates to machines for cleaning eggs and other objects and its purpose is to provide a machine which can clean a large number of objects per hour and can deal with each object individually to ensure effective results without damage to the objects.

According to the invention, an egg or other object cleaning machine comprises a conveyor for said objects, and a pair of rotating brushes disposed at opposite sides of the conveyor with their axes arranged in the direction of the conveyor movement, the rotational movement of the brushes being such as to effect rotation of the objects without lifting them from the conveyor.

This effect may be achieved in different ways. For example, the brushes may be rotated in the same angular direction with the downward component of one brush on the objects not less than the upward component of the other brush. The said downward component may be increased by rotating the corresponding brush at a higher speed and/or by providing it with a larger number of bristles. By rotating the objects different surface portions are successively presented to and cleaned by the brushes. The brushes may operate dry or may dip into a washing liquid.

The conveyor may be arranged to discharge the cleaned objects to a chute from which they may pass to a rotating bladed drum arranged to deliver them one at a time to, for example, a packing station. In this way fragile objects such as eggs are prevented from coming into contact with and possibly damaging one another.

An embodiment of egg washing machine in accordance with the invention is illustrated by way of example in the accompanying drawings wherein.

Figure 1:
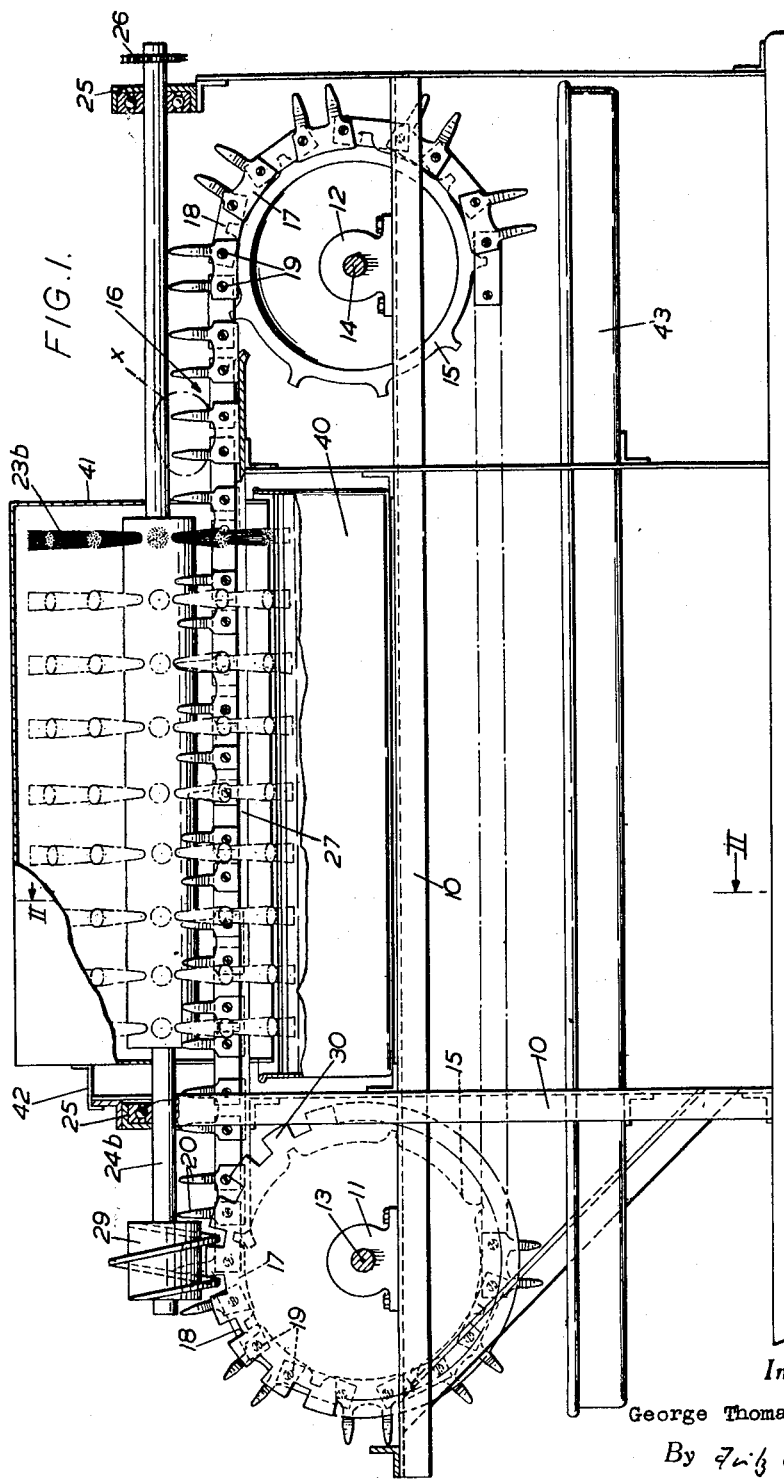
Figure 1 shows the washing machine in side elevational view with parts shown in section and broken away.
Figure 2:
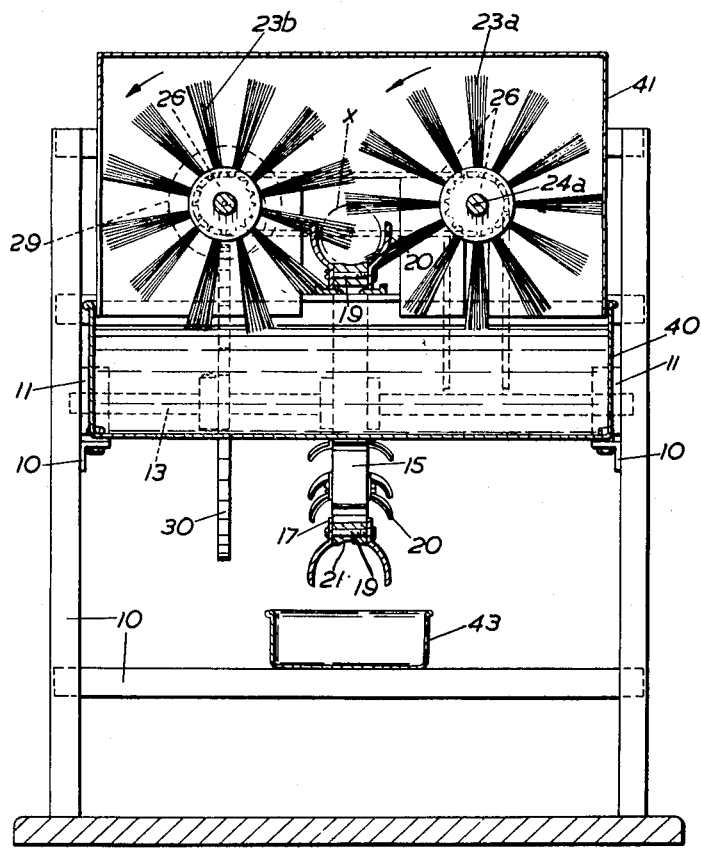
Figure 2 is a transverse section on line II—II of Figure 1.
Figure 3:
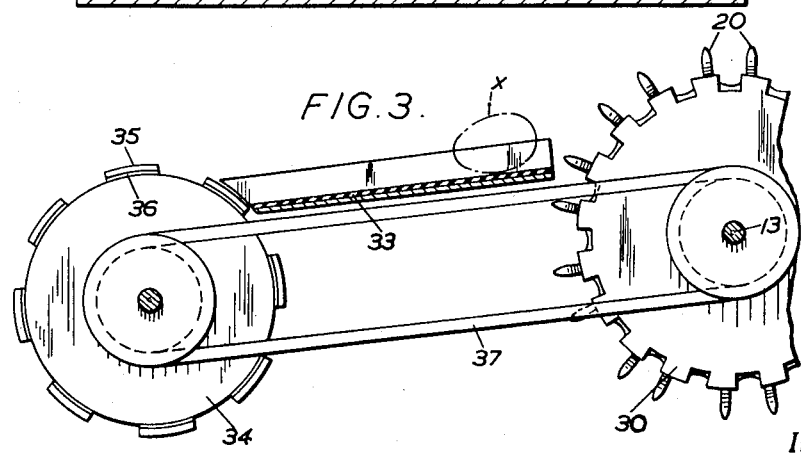
Figure 3 is a detail view showing one suitable form of device for removing the washed eggs from the machine of Figures 1 and 2.

The machine illustrated in Figures 1 and 2 comprises a frame 10 built up of angle section metal bar and supporting pairs of bearing brackets 11, 11 and 12, 12 adjacent its opposite ends in which are journalled two transverse shafts 13, 14. The shafts 13, 14 have each secured centrally thereto a peripherally flanged disc or pulley 15 about which is passed an endless conveyor 16 consisting of series of articulated links 17, 18 of, for example, aluminium, there being two longitudinal rows of links 17 arranged in laterally spaced parallel relationship and a central row of links 18. The links 17, 18 are interconnected by transverse bolts 19 which form the pivotal connections between said links. Each link 17 is provided with a pair of longitudinally spaced fingers 20 which are arranged so as, in relation to the upper conveyor run, to project upwardly from said link, and said fingers are also inwardly curved to approximately the shape of the eggs with sufficient play to allow for different sizes of eggs. The links 18, which are not provided with fingers, are in the form of plates or blocks of rectangular cross-section and have their upper faces 21, considered in relation to the upper conveyor run, transversely concaved so as to retain the eggs centrally of the conveyor.

Extending parallel to the conveyor and arranged one at either side of the upper conveyor run, are a pair of brushes 23a, 23b each mounted on a shaft 24a, 24b respectively journalled in bearings 25 at opposite ends of the machine frame. The brush shafts may be driven in any convenient manner such, for example, as through the medium of chain and sprocket gearing 26 from an electric motor (not shown) on the frame and in the arrangement shown both shafts are driven at the same speed and in the same direction. The brush shafts are arranged with their axes slightly above the plane of the upper ends of the fingers 20 of the upper conveyor run and are a short distance above the centres of the eggs $x$ supported between the fingers. The brush bristles may be about two or three inches long and the shaft axes are spaced so that as great a length of the bristles as possible wipes the eggs. The bearings 25a, 25b may be adjustably mounted so as to enable the shafts 24a, 24b to be moved laterally inwardly to take up wear in the brushes. A flanged runway 27 secured to the frame is provided between the pulleys 15 to support the upper run of the conveyor and keep it centrally aligned between the brushes. The conveyor belt extends horizontally beyond the brushes at opposite ends thereof.

The driving means for the brush shafts is also arranged to drive the conveyor and for this purpose the shaft 24b has secured thereon a worm member 29 which meshes with a toothed disc 30 secured on one of the transverse shafts 13. The conveyor is thus driven so that the eggs carried by the upper conveyor run are progressively passed at a constant speed between the brushes, the latter rotating at a ratio of, for example, between twenty and thirty to one in relation to the conveyor pulleys 15. The eggs are arranged with their axes lengthwise of the conveyor and thus the wiping action of the brushes will also cause the eggs to be turned so as to present successive surface portions to the brushes as they pass between said brushes, the bristles also passing between adjacent eggs so as to clean the end thereof. Any tendency of the eggs to lift from the conveyor due to the upward component of the brush 23b is counteracted by the downward component of the brush 23a. This effect may be improved by providing the brush 23a with a greater number of bristles than the brush 23b. Alternatively, or in addition the brush 23a may be rotated at a greater peripheral speed than the brush 23b.

In operation, the eggs are placed by the operator between the fingers of each transverse pair of links 17 at one end of the upper conveyor run, i. e., the right-hand end in Figure 1, and after passing between the brushes they may be discharged for conveyance to, for example, a packing station. For this purpose a rubber covered chute 33 is arranged to receive the eggs from the conveyor as the latter passes over the left-hand pulley 15, said chute being so inclined that the eggs will roll easily but not too quickly towards its lower end. Here the eggs are collected by a drum 34 provided on its periphery with angularly spaced longitudinal rubber blades or ribs 35 carried by metal strips 36 and may be delivered by said drum to, for example, a tray arranged with its receiving end slightly higher than its other end so that the eggs will then roll slowly down the tray without damaging one another. The drum may be conveniently driven from the adjacent pulley shaft 13 by, for example, chain and sprocket gear 37 and its peripheral speed may be substantially equal to or somewhat greater than the speed of the conveyor. The drum transfers the eggs one by one to the tray and thus prevents the eggs on or leaving the chute coming into contact with each other and possibly becoming cracked.

The brushes may operate dry, in which case the bristles may be made of wire. Alternatively, the brushes may be wetted so as to wash the eggs, a liquid tank 40 being supported beneath the brushes into which the ends of the brushes dip as the brushes rotate. In this case the brush bristles may be made of nylon. A cover 41 may be fitted over the brushes, being removably supported on the frame as shown by way of example at 42, and where a liquid tank is fitted the cover may, as shown, depend into the tank below the liquid level. The liquid in the tank may be changed continuously by means of any convenient supply and discharge arrangements, or the tank may be removed from time to time for discharge and re-filling simply by sliding it out sideways. A drip tray 43 may be provided beneath the lower run of the conveyor.

I claim:

1. A machine for cleaning eggs or like objects comprising an endless moving conveyor belt for said objects, said belt having an upper horizontal run and a lower horizontal run, a pair of rotary brushes disposed at opposite sides of the conveyor with their axes in a plane so far above the upper run of the conveyor belt that the centres of the objects are below the said plane, said axes extending in the direction of said belt, the bristles of said brushes being long enough for cleaning the whole of the object, the brushes rotating in the same direction, the first of said brushes imparting a downward component of force to the objects, and the second of said brushes imparting an upward component of force to the objects, the first brush imparting a sufficiently large component of force to the objects so that the objects are rotated without lifting them from the conveyor belt, a tank disposed beneath the upper run of the conveyor into which the brushes dip, pairs of fingers carried by the belt at intervals each pair projecting at opposite sides of the belt outwardly and partly around the objects to prevent the latter from slipping off the belt, said belt comprising blocks having upper surfaces which carry the objects along the brushes and are curved transversely to centralise the objects thereon, and links pivotally connecting said blocks together, said links carrying said fingers.

2. Machine as claimed in claim 1 having means for driving the brushes and means whereby the conveyor is driven from the brush-driving means at a speed substantially lower than the peripheral speed of the brushes.

3. Machine as claimed in claim 1 having pulleys for carrying the conveyor belt, a toothed disc secured to one of the conveyor pulleys, and a worm member mounted for rotation with one of the brushes and driving said toothed disc.

4. A machine as claimed in claim 1 having a chute positioned to receive the objects from the conveyor belt, and a rotating bladed drum receiving the objects from said chute.

References Cited in the file of this patent

UNITED STATES PATENTS

| | | |
|---|---|---|
| 204,993 | Paul | June 18, 1878 |
| 616,284 | Baker et al. | Dec. 20, 1898 |
| 842,378 | Baker | Jan. 29, 1907 |
| 956,426 | Rowland | Apr. 26, 1910 |
| 1,058,460 | Porter | Apr. 8, 1913 |
| 1,252,583 | Kellum | Jan. 8, 1918 |
| 1,464,775 | Reuter | Aug. 14, 1923 |
| 1,530,415 | Roussel | Mar. 17, 1925 |
| 1,695,054 | Morgan | Dec. 11, 1928 |
| 2,538,331 | Ruzsicska | Jan. 16, 1951 |
| 2,555,193 | Johnson | May 29, 1951 |
| 2,597,148 | Joseph | May 20, 1952 |
| 2,603,039 | Slocum et al. | July 15, 1952 |
| 2,627,140 | Marzolf | Feb. 3, 1953 |

FOREIGN PATENTS

| | | |
|---|---|---|
| 416,069 | Great Britain | Sept. 10, 1934 |
| 475,402 | Great Britain | Nov. 18, 1937 |